(12) United States Patent
Seo et al.

(10) Patent No.: US 8,174,816 B2
(45) Date of Patent: May 8, 2012

(54) CERAMIC ELECTRONIC COMPONENT

(75) Inventors: Dong Hwan Seo, Gyunggi-do (KR);
Kang Heon Hur, Gyunggi-do (KR);
Doo Young Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 142 days.

(21) Appl. No.: 12/648,223

(22) Filed: Dec. 28, 2009

(65) Prior Publication Data

US 2011/0007449 A1    Jan. 13, 2011

(30) Foreign Application Priority Data

Jul. 9, 2009  (KR) .................. 10-2009-0062591

(51) Int. Cl.
*H01G 4/00*     (2006.01)
(52) U.S. Cl. .................. 361/321.2; 361/303; 361/301.4; 361/311; 361/306.3; 361/321.3
(58) Field of Classification Search ............... 361/321.2, 361/303, 301.4, 306.3, 311
See application file for complete search history.

(56) References Cited

U.S. PATENT DOCUMENTS

| | | | |
|---|---|---|---|
| 5,805,409 A | 9/1998 | Takahara et al. | |
| 6,350,759 B1 | 2/2002 | Casara et al. | |
| 7,304,831 B2 * | 12/2007 | Yoshii et al. | 361/321.2 |
| 2006/0187613 A1 | 8/2006 | Yoshii et al. | |
| 2009/0040688 A1 | 2/2009 | Kayatani | |

FOREIGN PATENT DOCUMENTS

| | | |
|---|---|---|
| JP | 09-205035 | 1/1996 |
| JP | 10-284343 | 10/1998 |
| JP | 11-162771 | 6/1999 |
| JP | 2000-138131 A | 5/2000 |
| JP | 2007-067239 | 3/2007 |
| JP | 2007-234774 A | 9/2007 |
| JP | 2007-234800 | 9/2007 |
| JP | 2008-166666 A | 7/2008 |
| KR | 10-2005-0102767 A | 10/2005 |
| KR | 10-2006-0082671 A | 7/2006 |

OTHER PUBLICATIONS

Korean Office Action, w/ English translation thereof, issued in Korean Patent Application No. KR 10-2009-0062591 dated Feb. 11, 2011.
German Office Action, with English Translation, issued in German Patent Application No. 10-2009-055-254.5, dated Mar. 25, 2011.
Japanese Office Action, and English Translation Thereof, Issued in Japanese Patent Application No. 2009-293215 dated Nov. 22, 2011.

* cited by examiner

*Primary Examiner* — Nguyen T Ha
*Assistant Examiner* — Hung Dang
(74) *Attorney, Agent, or Firm* — McDermott Will & Emery LLP

(57) ABSTRACT

There is provided a ceramic electronic component including a ceramic sintered body, internal conductive layers, and external electrodes. Each of the external electrodes includes a first electrode layer, a conductive resin layer covering the first electrode layer, and a second electrode layer covering the conductive resin layer and having an extension length greater than the length of the first electrode layer extending from one of the side surfaces of the ceramic sintered body to the portions of the top and bottom surfaces thereof. The distance from the top or bottom surface of the ceramic sintered body to the closest layer of the internal conductive layers is greater than or equal to the length of the first electrode layer extending from one of the side surfaces of the ceramic sintered body to the portions of the top and bottom surfaces thereof.

4 Claims, 1 Drawing Sheet

US 8,174,816 B2

CERAMIC ELECTRONIC COMPONENT

CROSS-REFERENCE TO RELATED APPLICATIONS

This application claims the priority of Korean Patent Application No. 10-2009-0062591 filed on Jul. 9, 2009, in the Korean Intellectual Property Office, the disclosure of which is incorporated herein by reference.

BACKGROUND OF THE INVENTION

1. Field of the Invention

The present invention relates to ceramic electronic components, and more particularly, to ceramic electronic components having a high level of reliability in terms of thermal shock resistance and flexural strength.

2. Description of the Related Art

In general, electronic components using ceramic materials, such as capacitors, inductors, piezoelectric devices, varistors, or thermistors, include a ceramic sintered body made of ceramic materials, internal electrodes formed inside the ceramic sintered body, and external electrodes formed on the surfaces of the ceramic sintered body to be connected to the internal electrodes.

A multi-layer chip capacitor (hereinafter, also referred to as "MLCC") among ceramic electronic components includes a plurality of layered dielectric layers, internal electrodes disposed to face each other in which each pair of internal electrodes has one of the dielectric layers disposed therebetween, and external electrodes electrically connected to the internal electrodes.

The MLCC provides the advantages of compactness, high capacitance, and ease of mounting, so it is therefore used extensively in mobile communications devices such as computers, PDAs, and cellular phones.

The MLCC, when used, is mounted on a circuit board. More specifically, as shown in FIG. 1, a circuit board 1 has conductive lands 2 and 3 formed thereupon and the conductive lands 2 and 3 have solder fillets 4 and 5 respectively formed thereupon by soldering. Through the solder fillets 4 and 5, external electrodes 7 and 8 of a multi-layer chip capacitor 6 are electrically connected to the conductive lands 2 and 3, respectively.

When the MLCC is mounted on the circuit board by soldering and the circuit board is cut, thermal shock and shear stress are transmitted to the MLCC. When the thermal shock and the shear stress are transmitted, a crack may occur in the MLCC. The external and internal electrodes of the MLCC are easily shrunken and expanded, relative to ceramic materials. These shrinkage and expansion stresses are concentrated at the interface between the external electrodes and ceramic layers, whereby a crack may occur at the interface between the external electrodes and the ceramic layers. Also, the warping of the circuit board may cause a crack on the mounting area of the MLCC and at the interface between the external electrodes and the ceramic layers.

A circuit board, upon which the MLCC is mounted, is applicable to industries such as the airline industry, the automotive industry, and the consumer electronics industry. When a variation in temperature is transferred to such a circuit board, the stress caused by warpage or thermal shock is transmitted to the interface between the external electrodes and the ceramic layers of the MLCC, whereby a crack may occur.

When the stress is transmitted to the interface between the external electrodes and the ceramic layers, the crack starts therefrom and propagates in the body of the MLCC. The crack may be propagated toward the internal electrodes. When the crack is propagated to reach the internal electrodes, a short circuit may occur in the MLCC, thereby causing functional loss to an electronic device.

Korean Patent Laid-Open Publication No. 2006-0082671 discloses a method of improving the thermal and mechanical reliability of a multi-layer chip capacitor by ensuring that the length of external electrodes is greater than a certain predetermined measurement. However, when the MLCC manufactured by the use of such a method is mounted on a circuit board two or more times by the use of a reflow method, a crack occurs at the interface between the external electrodes and ceramic layers. Also, when a strong external force is applied to the circuit board upon which the MLCC is mounted causing it to be flexed by more than 2 mm, a crack occurs at the interface between the external electrodes and the ceramic layers of the MLCC, whereby electrostatic capacitance decreases.

U.S. Pat. No. 6,350,759 discloses that when external electrodes of a multi-layer chip capacitor are mounted on conductive lands of a circuit board, a separate metal terminal is used to reduce the occurrence of stress. The use of the additional metal terminal causes difficulties in a mounting process and problematic manufacturing of the additional element.

Therefore, there is a need for a method of developing greater mechanical reliability, considering the use environment of the MLCC, that is, a high level of reliability in terms of thermal shock resistance and flexural strength.

SUMMARY OF THE INVENTION

An aspect of the present invention provides a ceramic electronic component having a high level of mechanical reliability in terms of thermal shock resistance and flexural strength.

According to an aspect of the present invention, there is provided a ceramic electronic component including a ceramic sintered body having top and bottom surfaces and at least two side surfaces connecting the top and bottom surfaces, internal conductive layers formed inside the ceramic sintered body, and external electrodes electrically connected to the internal conductive layers. Each of the external electrodes may include a first electrode layer extending from one of the side surfaces of the ceramic sintered body to portions of the top and bottom surfaces thereof, a conductive resin layer covering the first electrode layer, and a second electrode layer covering the conductive resin layer and having an extension length greater than a length of the first electrode layer extending from one of the side surfaces of the ceramic sintered body to the portions of the top and bottom surfaces thereof. A distance from the top or bottom surface of the ceramic sintered body to the closest layer of the internal conductive layers may be greater than or equal to the length of the first electrode layer extending from one of the side surfaces of the ceramic sintered body to the portions of the top and bottom surfaces thereof.

The length of the first electrode layer extending from one of the side surfaces of the ceramic sintered body to the portions of the top and bottom surfaces thereof may correspond to 5% to 25% of the extension length of the second electrode layer.

The length of the first electrode layer extending from one of the side surfaces of the ceramic sintered body to the portions of the top and bottom surfaces thereof may range from 25 μm to 125 μm.

The distance from the top or bottom surface of the ceramic sintered body to the closest layer of the internal conductive layers may range from 40 μm to 150 μm.

The ceramic electronic component may be a multi-layer chip capacitor. The ceramic sintered body may be formed by laminating a plurality of ceramic dielectric layers. The internal conductive layers may include at least one pair of internal electrodes facing each other having one of the ceramic dielectric layers disposed therebetween and having different polarities. The external electrodes may be connected to an end of one electrode of the pair of internal electrodes and an end of the other electrode of the pair of internal electrodes, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
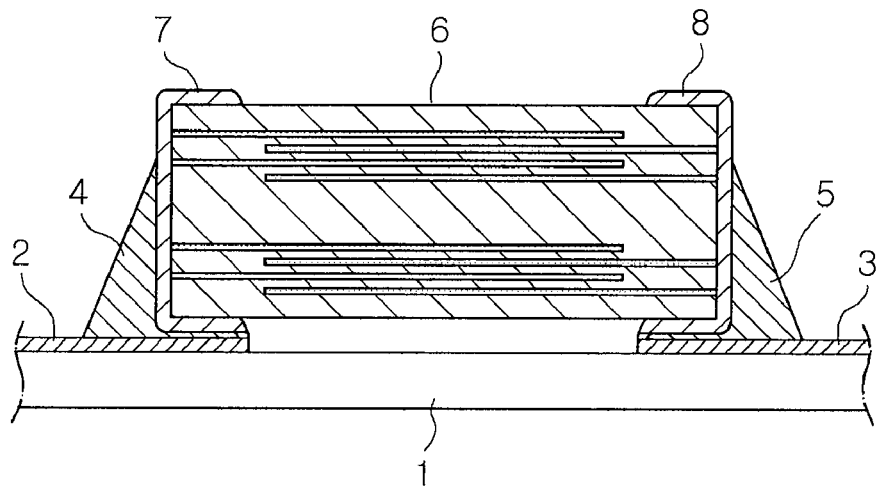
FIG. 1 is a schematic cross-sectional view illustrating a multi-layer chip capacitor mounted on a circuit board according to the related art.

Exemplary embodiments of the present invention will now be described in detail with reference to the accompanying drawings.

The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

The invention relates to ceramic electronic components. The electronic components using ceramic materials may be capacitors, inductors, piezoelectric devices, varistors, or thermistors. Hereinafter, a multi-layer chip capacitor (hereinafter, also referred to as "MLCC") will be described as an example of the electronic components.

Figure 2:
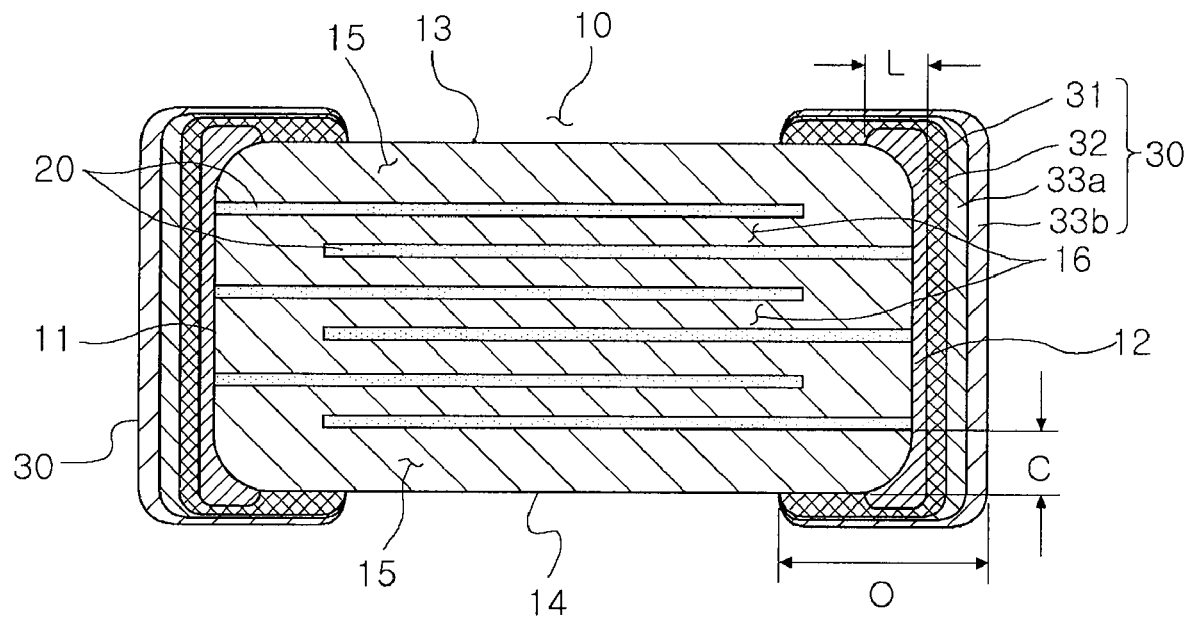
FIG. 2 is a schematic cross-sectional view illustrating a ceramic electronic component according to an exemplary embodiment of the present invention.

FIG. 2 is a schematic cross-sectional view illustrating a multi-layer chip capacitor according to an exemplary embodiment of the present invention.

A multi-layer chip capacitor according to an exemplary embodiment of the invention includes a ceramic sintered body 10 having a top surface 13, a bottom surface 14, and at least two side surfaces 11 and 12 connecting the top and bottom surfaces 13 and 14, internal conductive layers formed inside the ceramic sintered body 10, and external electrodes 30 electrically connected to internal conductive layers.

The ceramic sintered body 10 is formed by laminating a plurality of ceramic dielectric layers 15 and 16 and having the internal electrodes 20 formed therein. The ceramic sintered body 10 has the ceramic dielectric layers 15 disposed to form upper and lower surfaces. The adjacent ceramic dielectric layers are integrated to the extent that a boundary may not be apparent.

The internal conductive layers may be at least one pair of internal electrodes 20 that have different polarities. The pair of internal electrodes 20 are disposed to face each other in the lamination direction of the ceramic dielectric layers and have one of the ceramic dielectric layers 16 disposed therebetween. An end of each internal electrode 20 is alternately exposed at the side surfaces 11 and 12 of the ceramic sintered body 10.

A pair of external electrodes 30 are connected to an end of one electrode of the pair of internal electrodes 20 and an end of the other electrode of the pair of internal electrodes 20, respectively. The pair of external electrodes 30 have a multi-layered structure including a pair of first electrode layers 31, a pair of conductive resin layers 32, and a pair of second electrode layers 33.

The pair of first electrode layers 31 are electrically connected to the pair of internal electrodes 20, respectively. Each first electrode layer 31 extends from one of the side surfaces 11 or 12 of the ceramic sintered body 10 to portions of the top and bottom surfaces 13 and 14 thereof.

The pair of conductive resin layers 32 cover the pair of first electrode layers 31, respectively. The pair of second electrode layers 33 cover the pair of conductive resin layers 32, respectively. Each second electrode layer 33 extends to the top and bottom surfaces 13 and 14, for a greater distance than the length of the first electrode layer 31 extending from one of the side surfaces 11 or 12 of the ceramic sintered body 10 to portions of the top and bottom surfaces 13 and 14 thereof. That is, the length L of the first electrode layer 31 is smaller than the length O of the second electrode layer 33, in which the lengths L and O extend from one of the side surfaces 11 or 12 of the ceramic sintered body 10 to portions of the top and bottom surfaces 13 and 14 thereof.

Also, the distance C from the top or bottom surface 13 or 14 of the ceramic sintered body 10 to the closest electrode of the internal electrodes 20 is greater than or equal to the length L of the first electrode layer 31.

Ceramic materials forming the ceramic sintered body 10 may be selected according to varieties of ceramic electronic components. The ceramic sintered body of the MLCC among the ceramic electronic components is formed by laminating a plurality of ceramic dielectric layers as described above. The ceramic dielectric layers are formed of dielectric materials containing ceramic materials. The ceramic materials contained in the dielectric materials may have a high dielectric constant. The ceramic materials may be $BaTiO_3$-based materials, Pb-complex Perovskite-based materials or $SrTiO_3$-based materials. However, the invention is not limited thereto.

The internal electrodes 20 are formed of conductive metals, for example, Ni or Ni alloy. The Ni alloy may contain Mn, Cr, Co or Al together with Ni.

More specifically, the ceramic sintered body may be manufactured by the following method.

Ceramic powder having $BaTiO_3$ as its main ingredient and a binder are mixed to form a slurry, and then ceramic green sheets are manufactured. A conductive paste having Ni as its main ingredient is applied to the manufactured ceramic green sheets such that internal electrode patterns are formed. The ceramic green sheets, upon which the internal electrode patterns are not formed, and the ceramic green sheets, upon which the internal electrode patterns capable of having electrostatic capacitance are formed, are laminated in a thickness direction and compressed by heat, thereby manufacturing a ceramic laminate having internal electrodes formed therein.

Such a ceramic laminate is cut to a predetermined chip size and fired at 1100° C. to 1300° C. in an $N_2$—$H_2$ atmosphere. The ceramic laminate is cut to the predetermined chip size such that it has two side surfaces facing each other and top and bottom surfaces connecting the side surfaces.

As described above, the pair of external electrodes 30, connected to an end of one electrode of the pair of internal electrodes 20 and an end of the other electrode of the pair of internal electrodes 20, respectively, have the multi-layered structure including the pair of first electrode layers 31, the pair of conductive resin layers 32, and the pair of second electrode layers 33.

The pair of first electrode layers 31 each extend from one of the side surfaces 11 or 12 of the ceramic sintered body 10 to the portions of the top and bottom surfaces 13 and 14 thereof. The pair of first electrode layers 31 are electrically and mechanically connected to the pair of internal electrodes 20, respectively. The pair of first electrode layers 31 are formed of conductive metals that make a satisfactory electrical connection to the pair of internal electrodes 20. For example, Ag, Ni, Cu or an alloy thereof may be used.

The pair of first electrode layers 31 are formed by applying a conductive paste including glass frit from the side surfaces 11 and 12 of the ceramic sintered body 10 to the portions of the top and bottom surfaces 13 and 14 thereof. The pair of first electrode layers 31 are fired at 780° C. in a nitrogen atmosphere to be electrically and mechanically connected to the pair of internal electrodes 20.

The pair of conductive resin layers 32 cover the pair of first electrode layers 31, respectively. The pair of conductive resin layers 32 include thermosetting resin and conductive materials. The thermosetting resin may be phenol resin or epoxy resin. A conductive filler may be silver coated copper powder.

The pair of conductive resin layers 32 may cover the pair of first electrode layers 31, respectively. The pair of conductive resin layers 32 each may extend to the length O of the second electrode layer 33.

Since the thermosetting resin is flexible, when stress is transmitted to the external electrodes 30, the pair of conductive resin layers 32 including the thermosetting resin may cause the stress load to be lessened.

The pair of conductive resin layers 32 may include a hardener together with the thermosetting resin. The use of the hardner facilitates forming the cross-linked structure of the thermosetting resin. The hardener may be phenol resin, an amine, an acid anhydride or the like, which is well-known as the hardener of the thermosetting resin.

The pair of second electrode layers 33 cover the pair of conductive resin layers 32, respectively. The pair of second electrode layers 33 may be formed on the pair of conductive resin layers 32 by the use of a wet plating technique such as electroplating.

Each second electrode layer 33 may include two layers, more particularly, an Ni electrode layer 33$a$ and an Sn electrode layer 33$b$. These Ni and Sn electrode layers 33$a$ and 33$b$ make a satisfactory electrical connection between the external electrodes 30 and the conductive lands of the circuit board.

The length L of the first electrode layer 31 is smaller than the length O of the second electrode layer 33, in which the lengths L and O extend from one of the side surfaces 11 or 12 of the ceramic sintered body 10 to the portions of the top and bottom surfaces 13 and 14 thereof.

Since glass constituents contained in a conductive metal paste applied to the first electrode layer 31 and the ceramics of the ceramic sintered body 10 are reacted, a fragile reaction layer is formed at the interface between the first electrode layer 31 and the ceramic sintered body 10. Also, the materials forming the first electrode layer 31 are easily shrunken and expanded by thermal shock, relative to ceramic materials. When stress is transmitted to the interface between the first electrode layer 31 and the ceramic sintered body 10, a crack may start therefrom and propagate in the ceramic sintered body 10.

For example, when the stress is transmitted according to the warping of the circuit board, upon which the MLCC is mounted, a crack may be propagated from the end of the first electrode layer 31 toward the internal electrodes 20. In case that the crack reaches the internal electrodes 20, a short circuit may occur in the MLCC.

However, when the length L of the first electrode layer 31 is small as defined in this embodiment, the areas of the interface between the first electrode layer 31 and the ceramic dielectric layers 15 become smaller and the extent of expansion and shrinkage caused by heat is reduced, whereby the possibility of crack occurrence is reduced.

Also, when the length L of the first electrode layer 31 becomes smaller, the areas in which the conductive resin layer 32 and the ceramic dielectric layers 15 are joined increase. This may cause the conductive resin layer 32 to sufficiently ease the stress concentrated at the interface between the first electrode layer 31 and the ceramic dielectric layers 15.

Also, as described above, the ceramic sintered body 10 is formed by laminating the plurality of layered dielectric layers 15 and 16, in which at least one pair of internal electrodes 20 have one of the ceramic dielectric layers 16 disposed therebetween and the ceramic dielectric layers 15 disposed to form the upper and lower surfaces of the ceramic sintered body 10. That is, the top and bottom surfaces 13 and 14 of the ceramic sintered body 10 are formed by the ceramic dielectric layers 15. The distance C from the top or bottom surface 13 or 14 of the ceramic sintered body 10 to the closest electrode of the internal electrodes 20 is greater than or equal to the length L of the first electrode layer 31.

When thermal shock and flexural stress are transmitted to the MLCC mounted on the circuit board, stress is concentrated at the interface between the first electrode layer 31 and the ceramic dielectric layers 15, whereby a crack may occur. Such a crack may develop toward the internal electrodes 20. As defined in this embodiment, when the distance C from the top or bottom surface 13 or 14 of the ceramic sintered body 10 to the closest electrode of the internal electrodes 20, that is, the thickness of the ceramic dielectric layers 15 formed at the external surface is greater than or equal to the length L of the first electrode layer 31, the development of a crack in the internal electrodes 20 may be prevented. In this case, a short circuit that may be caused by a crack occurring in the internal electrodes 20 may be prevented.

More specifically, the length L of the first electrode layer 31 extending from one of the side surfaces 11 or 12 of the ceramic sintered body 10 to the portions of the top and bottom surfaces 13 and 14 thereof may correspond to 5% to 25% of the length O of the second electrode layer 33. The length L of the first electrode layer 31 may be determined according to chip size. For example, the length L of the first electrode layer 31 extending from one of the side surfaces 11 or 12 of the ceramic sintered body 10 to the portions of the top and bottom surfaces 13 and 14 thereof may range from 25 μm to 125 μm. When the length L of the first electrode layer 31 is 25 μm or more and the length O of the second electrode layer 33 is greater than the length L of the first electrode layer 31, the length L of the first electrode layer 31 extending to the top and bottom surfaces 13 and 14 of the ceramic sintered body 10 is small, whereby the extent of expansion and shrinkage caused by heat decreases. Also, the areas in which the stress can be eased by the conductive resin layer 32 increase, whereby there is a low incidence of a crack at the interface between the first electrode layer 31 and the ceramic dielectric layers 15. When the length L of the first electrode layer 31 is less than 25 μm, the first electrode layer 31 is not electrically and mechanically connected to the internal electrodes 20, whereby electrostatic capacitance may decrease.

Also, when the distance C from the top or bottom surface 13 or 14 of the ceramic sintered body 10 to the closest electrode of the internal electrodes 20 is less than 125 μm, if a crack occurs at the interface between the first electrode layer 31 and the ceramic sintered body 10, the crack may be propagated to the areas in which the internal electrodes 20 are formed. However, when the distance C from the top or bottom surface 13 or 14 of the ceramic sintered body 10 to the closest electrode of the internal electrodes 20 is equal to or greater than 125 μm, although a crack may occur, the crack will not be propagated to the areas in which the internal electrodes 20 are formed.

Preferably, the distance C from the top or bottom surface 13 or 14 of the ceramic sintered body 10 to the closest electrode of the internal electrodes 20 may range from 40 μm to 150 μm.

Hereinafter, inventive and comparative examples of the invention will be described in detail. These examples are provided to assist in a comprehensive understanding of the invention, and should not be construed as limited to the examples set forth herein.

Inventive Examples 1 and 2

Ceramic powder having $BaTiO_3$ as its main ingredient and a binder were mixed to form a slurry, and then ceramic green sheets were manufactured by the use of a doctor blade method. A conductive paste having Ni as its main ingredient was applied to the manufactured ceramic green sheets by the use of a screen printing method such that internal electrode patterns were formed. Fifty layers of internal electrodes were laminated and compressed by heat, thereby forming an MLCC laminate. This MLCC laminate was then cut to be 1.6 mm×0.8 mm and fired at 1250° C. in an $N_2$—$H_2$ atmosphere, thereby manufacturing a ceramic sintered body of the MLCC. A conductive paste including glass frit was dipped and coated from the side surfaces of the ceramic sintered body to portions of the top and bottom surfaces thereof such that a pair of first electrode layers were formed. The pair of first electrode layers were fired at 780° C. in a nitrogen atmosphere to be electrically and mechanically connected to the internal electrodes.

Next, curable compounds, including epoxy resin and conductive materials, were dipped, coated, dried, and hardened (cured) onto the pair of first electrode layers, thereby forming a pair of conductive resin layers. By the use of an electroplating method, a pair of Ni electrode layers were formed on the pair of conductive resin layers, and then a pair of Sn electrode layers were formed thereon such that a pair of second electrode layers were formed. The length L of the first electrode layer corresponded to 5% and 25% (L/O) of the length O of the second electrode layer, in which the lengths L and O extended from one of the side surfaces of the ceramic sintered body to portions of the top and bottom surfaces thereof. The distance C from the top and bottom surfaces of the ceramic sintered body to their respective closest internal electrodes corresponded to 10% and 25% (C/O) of the length O of the second electrode layer such that it was greater than the length L of the first electrode layer.

Comparative Example 1

Although manufactured as the inventive example in the same manner, the length L of the first electrode layer corresponded to 2.5% (L/O) of the length O of the second electrode layer, and the distance C from the top and bottom surfaces of the ceramic sintered body to their respective closest internal electrodes corresponded to 5% (C/O) of the length O of the second electrode layer.

Comparative Example 2

Although manufactured as the inventive example in the same manner, the length L of the first electrode layer corresponded to 50% (L/O) of the length O of the second electrode layer, and the distance C from the top and bottom surfaces of the ceramic sintered body to their respective closest internal electrodes corresponded to 10% and 25% (C/O) of the length O of the second electrode layer such that it was smaller than the length L of the first electrode layer.

Comparative Example 3

Although manufactured as the inventive example in the same manner, the length L of the first electrode layer was equal to the length of the conductive resin layer, and the distance C from the top and bottom surfaces of the ceramic sintered body to their respective closest internal electrodes corresponded to 10% and 25% (C/O) of the length O of the second electrode layer such that it was smaller than the length L of the first electrode layer.

[Evaluation]

The fifty respective MLCCs manufactured according to the exemplary and comparative examples were prepared and mounted on a printed circuit board (PCB) presented in International Electrotechnical Commission (IEC) 60068-2-21.

A standard test method, that is, AECQ-200-REV. C Method-005 (Board Flex Test) provides a maximum board flex of 2 mm, but the present invention evaluated the extent of the board flex with reference to 10 mm. In case of board flex of 10 mm, when there were one or more samples whose electrostatic capacitance decreased by 5% or more, it was considered that the decrease of electrostatic capacitance occurred. In contrast, when there was no sample whose electrostatic capacitance decreased by 5% or more, it was considered that the decrease of electrostatic capacitance did not occur. These results are presented in Table 1 as below.

TABLE 1

|  | External Electrode Length (L/O) | Cover Layer Thickness (C/O) | Electrostatic Capacitance Decrease |
|---|---|---|---|
| Inventive Example | 5% | 10% | X |
|  | 25% | 25% | X |
| Comparative Example 1 | 2.5% | 5% | ○ |
| Comparative Example 2 | 50% | 10% | ○ |
|  | 50% | 25% | ○ |
| Comparative Example 3 | 100% | 10% | ○ |
|  | 100% | 25% | ○ |

As described above, although the board flex occurs due to thermal and mechanical stresses, the MLCC is manufactured to have the length O of the second electrode layer greater than the length L of the first electrode layer and the distance C from the top and bottom surfaces of the ceramic sintered body to their respective closest internal electrodes greater than the length L of the first electrode layer, whereby the decrease of electrostatic capacitance in the MLCC does not occur and thermal and mechanical reliability is improved.

As set forth above, according to exemplary embodiments of the invention, the ceramic electronic component has the length of the first electrode layer smaller than that of the second electrode layer such that the area, in which the conductive resin layer capable of easing (mechanical) stress is formed, increases. Therefore, even though the ceramic electronic component is mounted on the circuit board and used in the environment where a variation in temperature is high, cracks that may be caused by the flexural stress and the thermal shock do not occur. Although the cracks may occur, the cracks are not propagated to the internal electrodes, whereby the electrostatic capacitance does not decrease.

While the present invention has been shown and described in connection with the exemplary embodiments, it will be apparent to those skilled in the art that modifications and variations can be made without departing from the spirit and scope of the invention as defined by the appended claims.

What is claimed is:

1. A ceramic electronic component comprising:
a ceramic sintered body having top and bottom surfaces and at least two side surfaces connecting the top and bottom surfaces;
internal conductive layers formed inside the ceramic sintered body; and
external electrodes electrically connected to the internal conductive layers,
wherein each of the external electrodes comprises a first electrode layer extending from one of the side surfaces of the ceramic sintered body to portions of the top and bottom surfaces thereof, a conductive resin layer covering the first electrode layer, and a second electrode layer covering the conductive resin layer and having an extension length greater than a length of the first electrode layer extending from one of the side surfaces of the ceramic sintered body to the portions of the top and bottom surfaces thereof, wherein:
a distance from the top or bottom surface of the ceramic sintered body to the closest layer of the internal conductive layers is greater than or equal to the length of the first electrode layer extending from one of the side surfaces of the ceramic sintered body to the portions of the top and bottom surfaces thereof, and
the length of the first electrode layer extending from one of the side surfaces of the ceramic sintered body to the portions of the top and bottom surfaces thereof corresponds to 5% to 25% of the extension length of the second electrode layer.

2. The ceramic electronic component of claim 1, wherein the length of the first electrode layer extending from one of the side surfaces of the ceramic sintered body to the portions of the top and bottom surfaces thereof ranges from 25□ to 125□.

3. The ceramic electronic component of claim 1, wherein the distance from the top or bottom surface of the ceramic sintered body to the closest layer of the internal conductive layers ranges from 40□ to 150□.

4. The ceramic electronic component of claim 1, wherein the ceramic electronic component is a multi-layer chip capacitor,
wherein the ceramic sintered body is formed by laminating a plurality of ceramic dielectric layers,
the internal conductive layers comprise at least one pair of internal electrodes facing each other having one of the ceramic dielectric layers disposed therebetween and having different polarities, and
the external electrodes are connected to an end of one electrode of the pair of internal electrodes and an end of the other electrode of the pair of internal electrodes, respectively.

* * * * *